Figure 1:
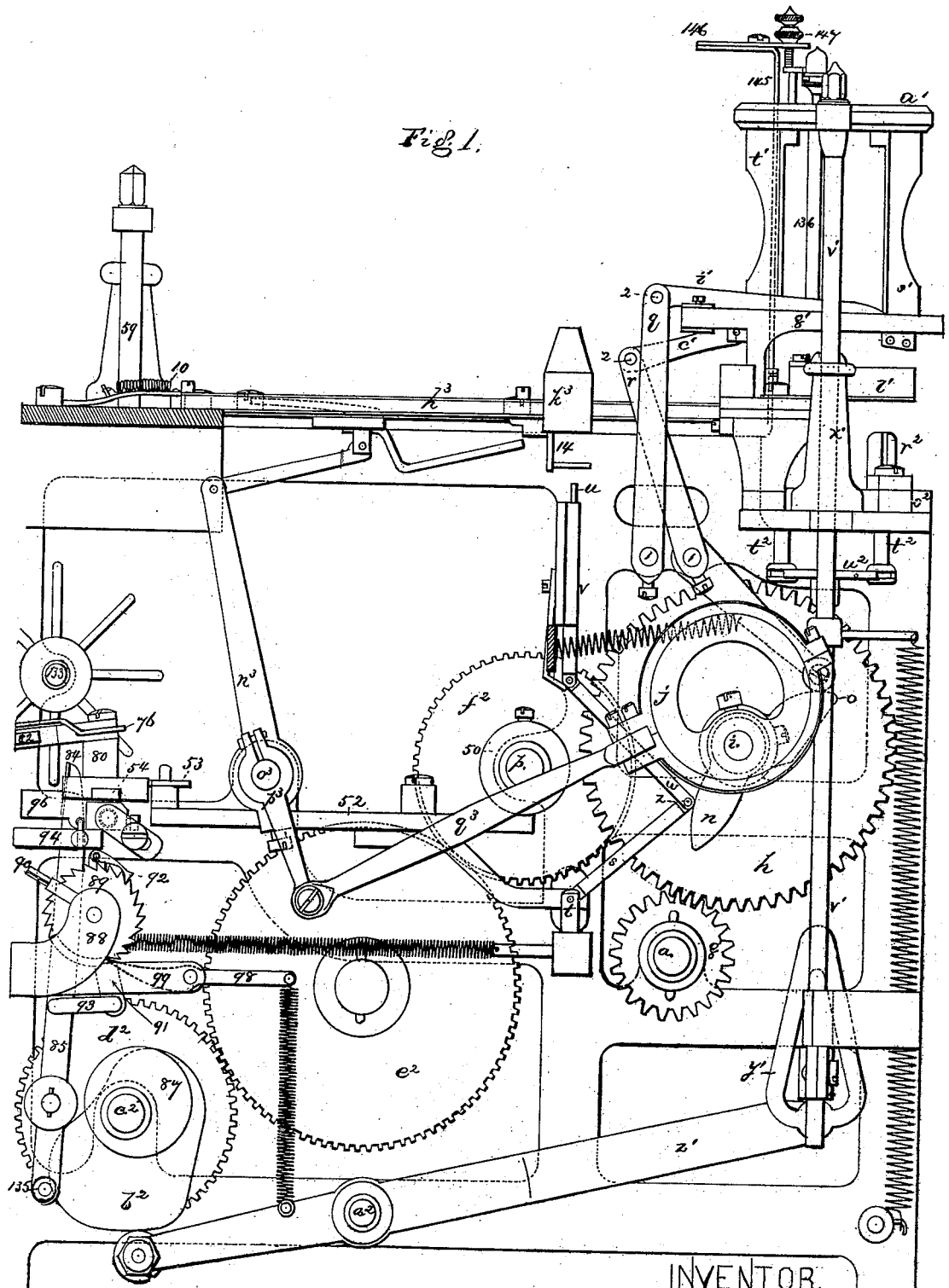

H. J. WICKHAM.
ENVELOPE-MACHINE.

No. 177,048.

14 Sheets—Sheet 1.

Patented May 2, 1876.

WITNESSES
S. B. Kidder
W. J. Pratt

INVENTOR.
Horace J. Wickham
per Crosby & Gregory
Attys.

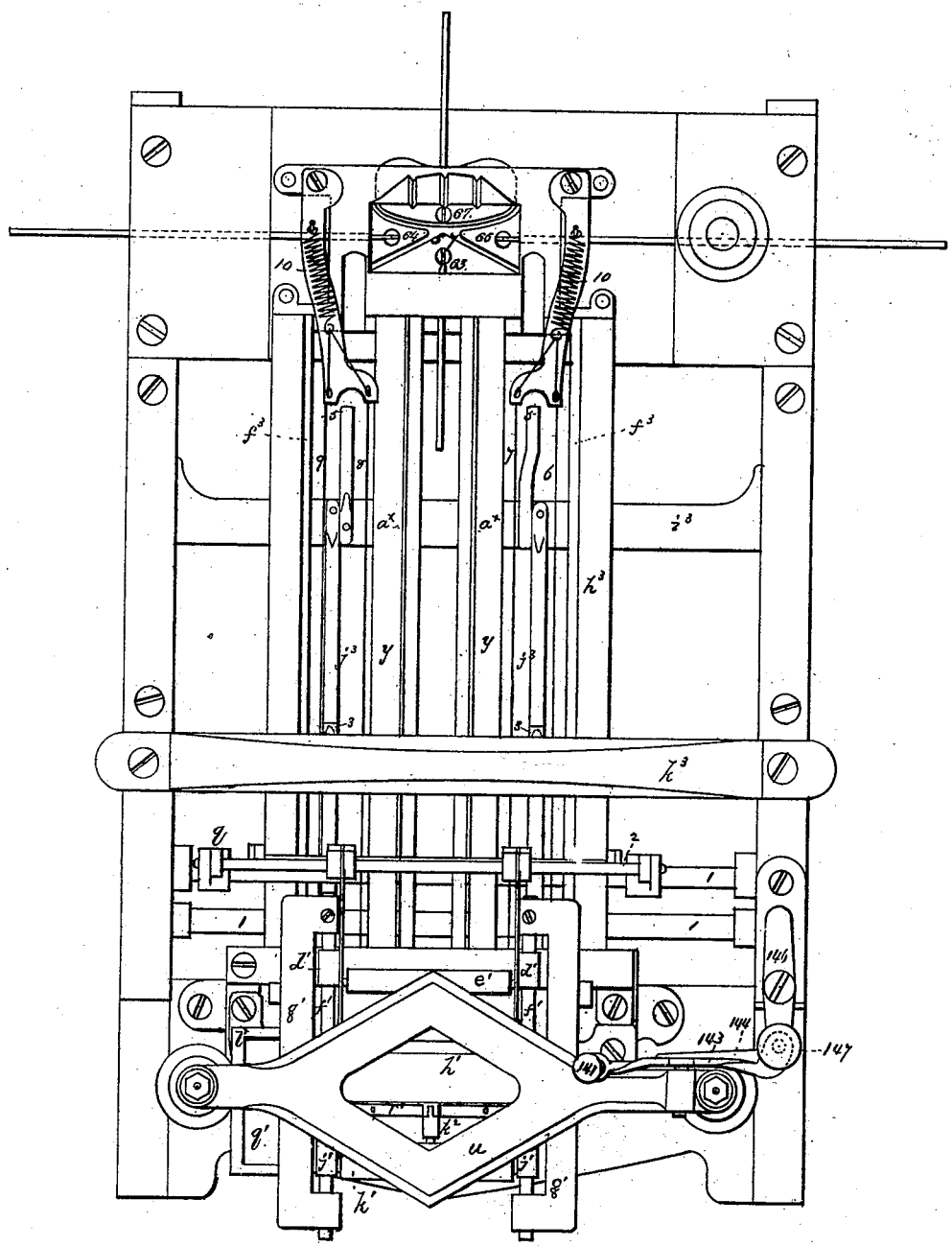

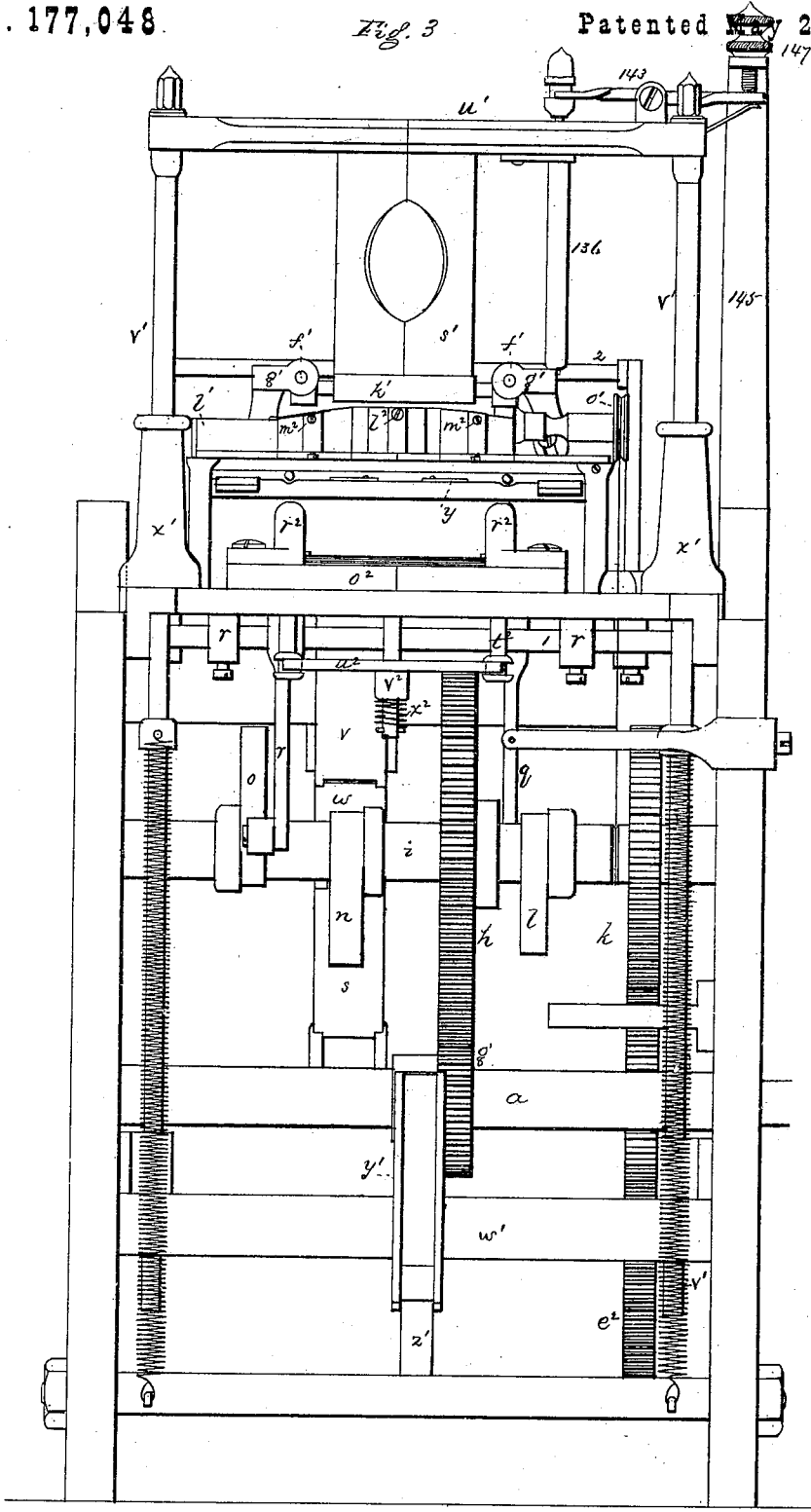

H. J. WICKHAM.
ENVELOPE-MACHINE.
No. 177,048.
14 Sheets—Sheet 4.
Patented May 2, 1876.
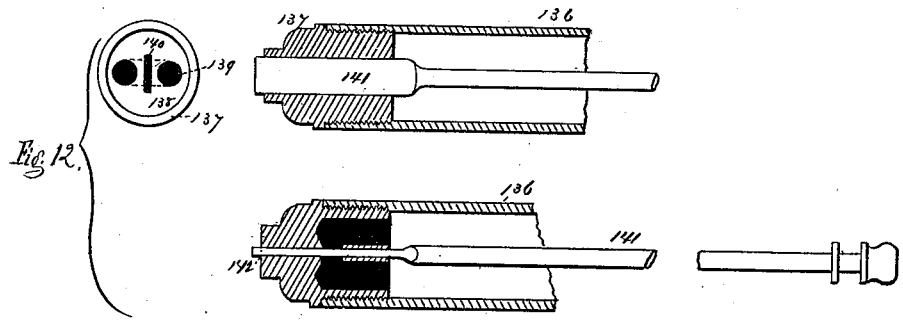
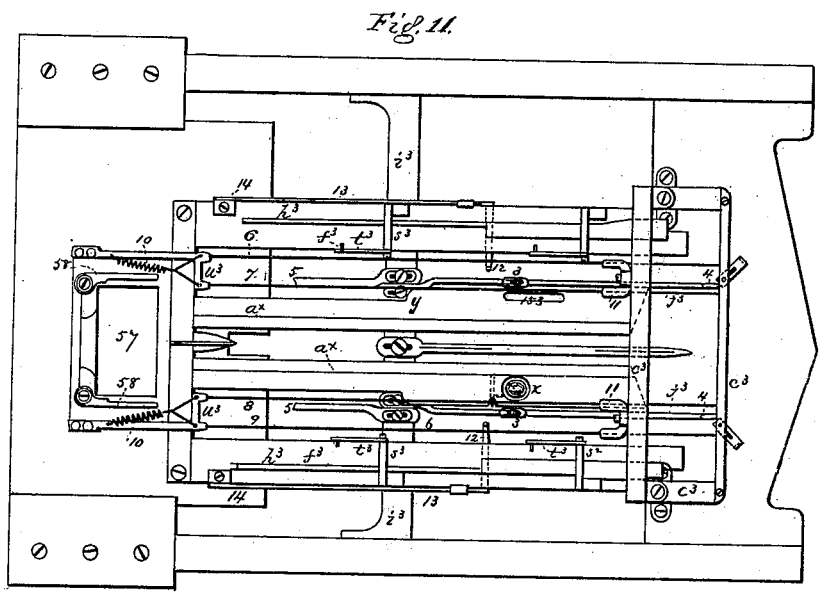
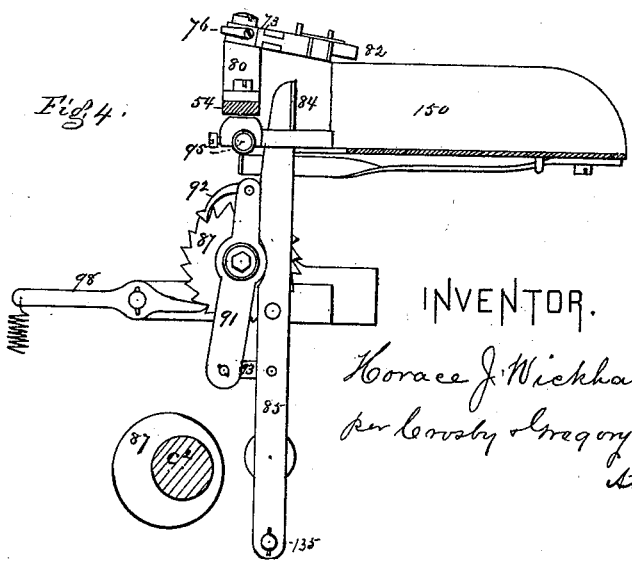
WITNESSES.
L. H. Latimer.
W. J. Pratt.
INVENTOR.
Horace J. Wickham
per Crosby & Gregory
Attys

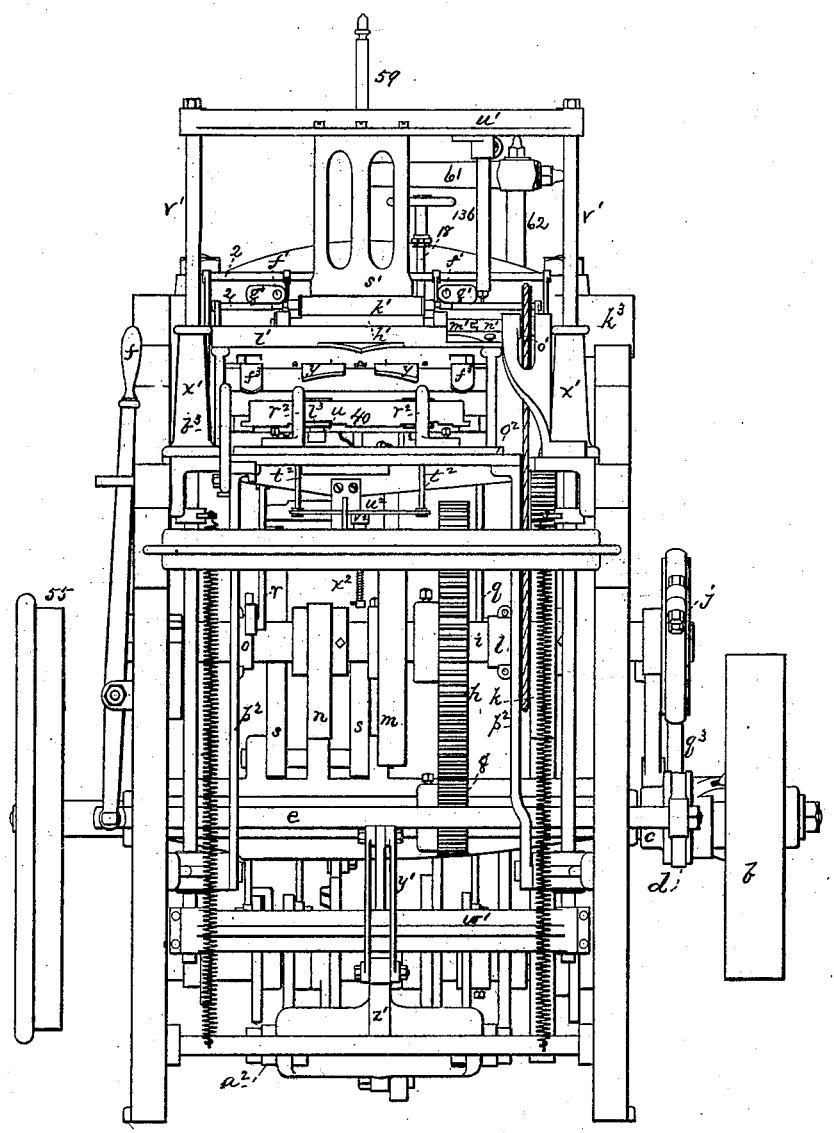

14 Sheets—Sheet 6.

H. J. WICKHAM.
ENVELOPE-MACHINE.

No. 177,048. Patented May 2, 1876.

WITNESSES.
L. H. Latimer.
W. J. Pratt.

INVENTOR.
Horace J. Wickham
per Crosby & Gregory
Attys

H. J. WICKHAM.
ENVELOPE-MACHINE.

No. 177,048.

14 Sheets—Sheet 8.

Patented May 2, 1876.

WITNESSES.
E. H. Latimer.
W. J. Pratt.

INVENTOR.
Horace J. Wickham
per Crosby & Gregory
Attys

14 Sheets—Sheet 9.

H. J. WICKHAM.
ENVELOPE-MACHINE.

No. 177,048. Patented May 2, 1876.

WITNESSES.
L. H. Latimer.
W. J. Pratt.

INVENTOR.
Horace J. Wickham
per Crosby & Gregory
Atty.

H. J. WICKHAM.
ENVELOPE-MACHINE.

No. 177,048.

14 Sheets—Sheet 10.

Patented May 2, 1876.

WITNESSES
L. H. Latimer.
W. J. Pratt.

INVENTOR
Horace J. Wickham
per Crosby & Gregory
Attys

H. J. WICKHAM.
ENVELOPE-MACHINE.
No. 177,048. Patented May 2, 1876.
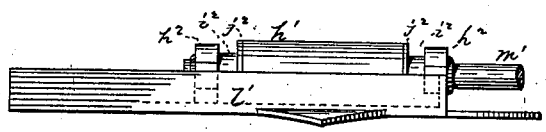
Fig. 13.
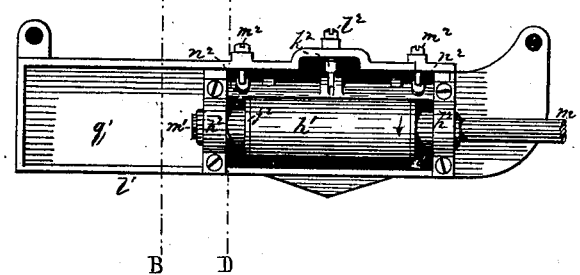
Fig. 14.
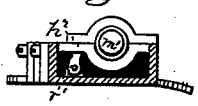
Fig. 15.
Section on AB.
Fig. 16.
Section on CD.
WITNESSES.
L. H. Latimer,
W. J. Pratt.
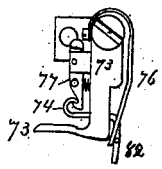
INVENTOR.
Horace J. Wickham
per Crosby & Gregory
Attys.

H. J. WICKHAM.
ENVELOPE-MACHINE.
No. 177,048.
14 Sheets—Sheet 12.
Patented May 2, 1876.
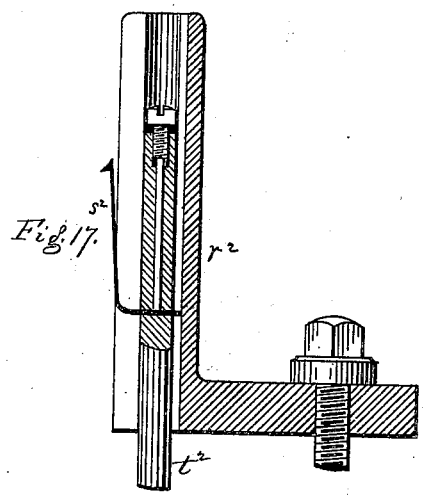
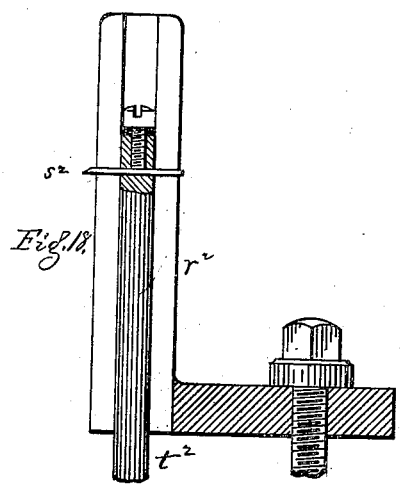
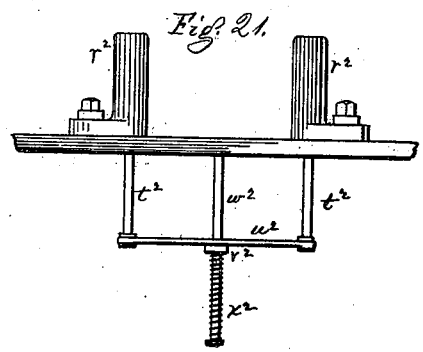
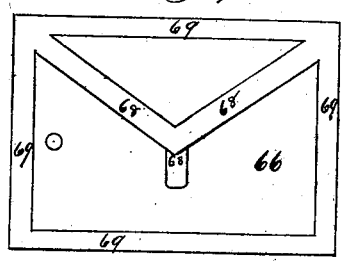
WITNESSES.
L. H. Latimer.
W. J. Pratt.
INVENTOR
Horace J. Wickham
per Crosby & Gregory
Attys 14 Sheets—Sheet 13.
H. J. WICKHAM.
ENVELOPE-MACHINE.
No. 177,048. Patented May 2, 1876.
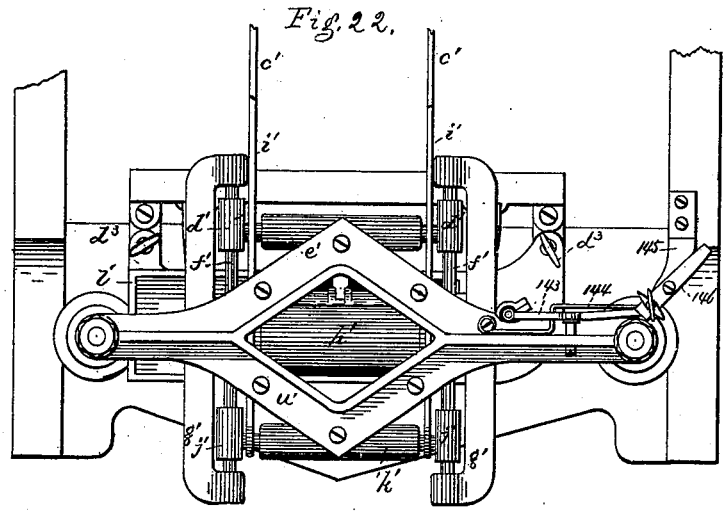
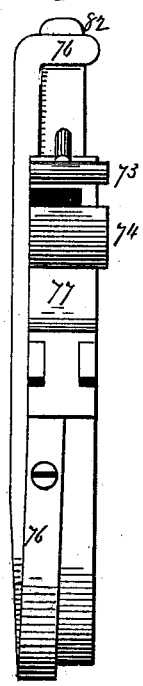
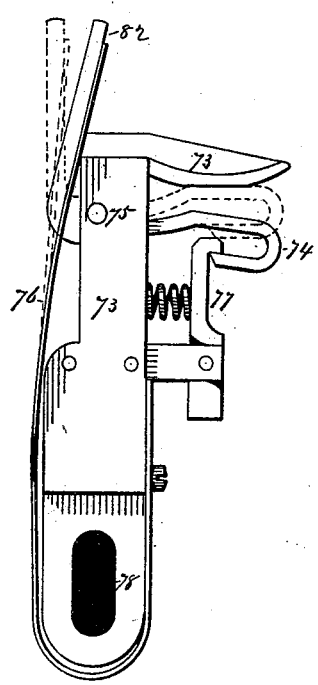
WITNESSES.
L. H. Latimer.
W. J. Pratt.
INVENTOR.
Horace J. Wickham
per Crosby & Gregory
Atty 14 Sheets—Sheet 14.

H. J. WICKHAM.
ENVELOPE-MACHINE.

No. 177,048. Patented May 2, 1876.

WITNESSES.
L. H. Latimer.
W. J. Pratt.

INVENTOR.
Horace J. Wickham
per Crosby & Gregory
Atty

UNITED STATES PATENT OFFICE.

HORACE J. WICKHAM, OF HARTFORD, CONNECTICUT, ASSIGNOR TO MORGAN ENVELOPE COMPANY, OF SPRINGFIELD, MASSACHUSETTS, AND PLIMPTON MANUFACTURING COMPANY, OF HARTFORD, CONNECTICUT.

IMPROVEMENT IN ENVELOPE-MACHINES.

Specification forming part of Letters Patent No. 177,048, dated May 2, 1876; application filed April 7, 1876.

*To all whom it may concern:*

Be it known that I, HORACE J. WICKHAM, of Hartford, in the county of Hartford and State of Connecticut, have invented an Improved Machine for the Manufacture of Envelopes, of which the following is a specification:

This invention relates to mechanism for the manufacture of envelopes; and consists in an organization of mechanism, substantially as described, whereby on a single machine the envelope-blank is gummed, is carried forward to a stamping or printing apparatus, and is stamped with the Government stamp, or printed; or both, and is then carried to a folding mechanism, when the stamped or printed blank is folded and delivered; also, in the combination, with the envelope-blank-sustaining bed, of hollow posts, and separators within the posts, to bear on the uppermost blank, and against its edge, as hereafter described, to press it toward the back posts, to insure the selection and lifting of but a single blank by the gummers; also, in the combination, with the gum-box and its roller and scraper, of devices whereby the scraper may be moved away from the roller, to clear the box of pieces of paper or other foreign substances, and be replaced in exactly the same position without removing the scraper-adjusting screws; also, in a picker adapted to draw or pick out the folded envelopes from the envelope-carrier, and place certain of the envelopes at stated intervals, with their ends beyond the adjacent envelopes, to facilitate packaging; and in certain combination of devices hereafter described.

Figure 6:
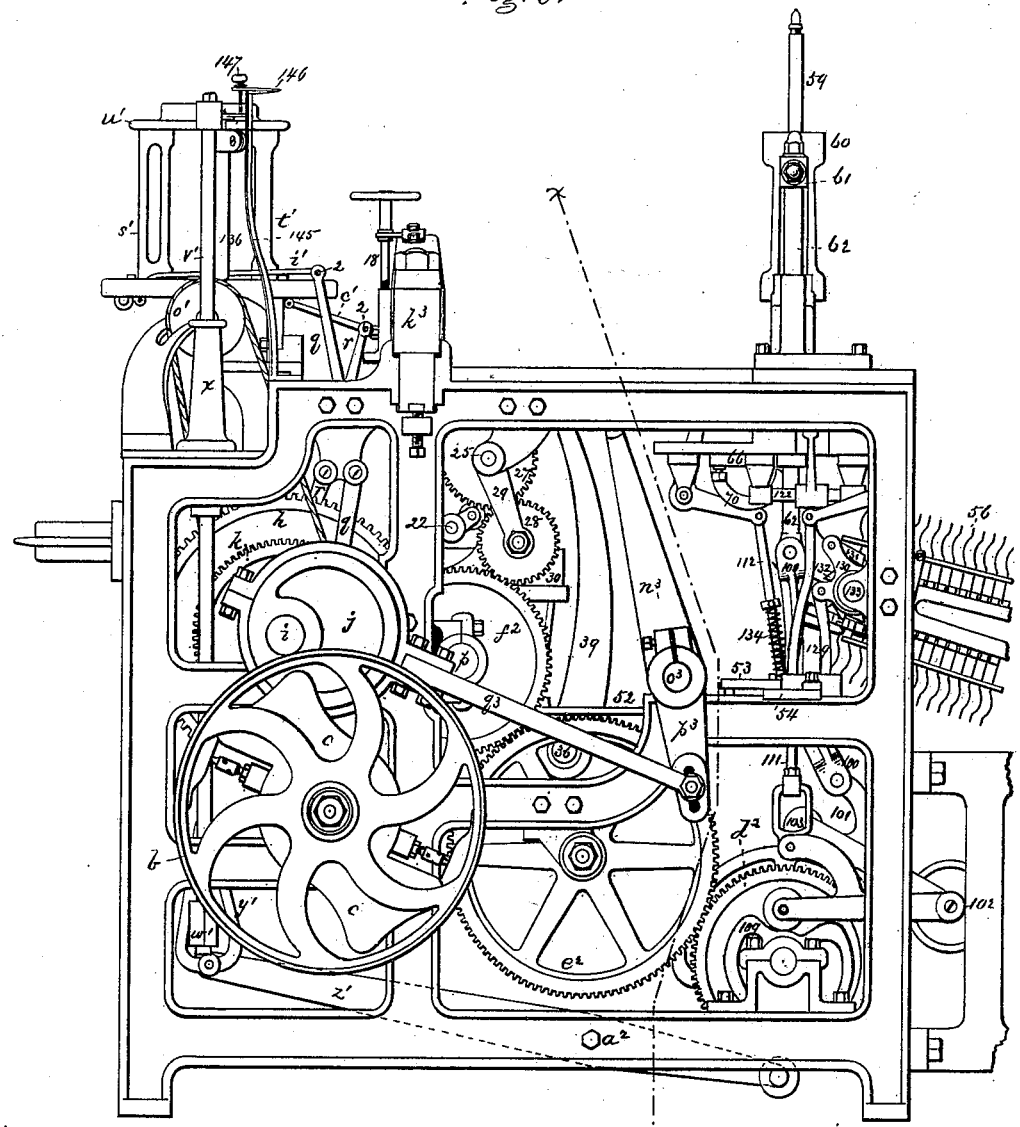
Figure 7:
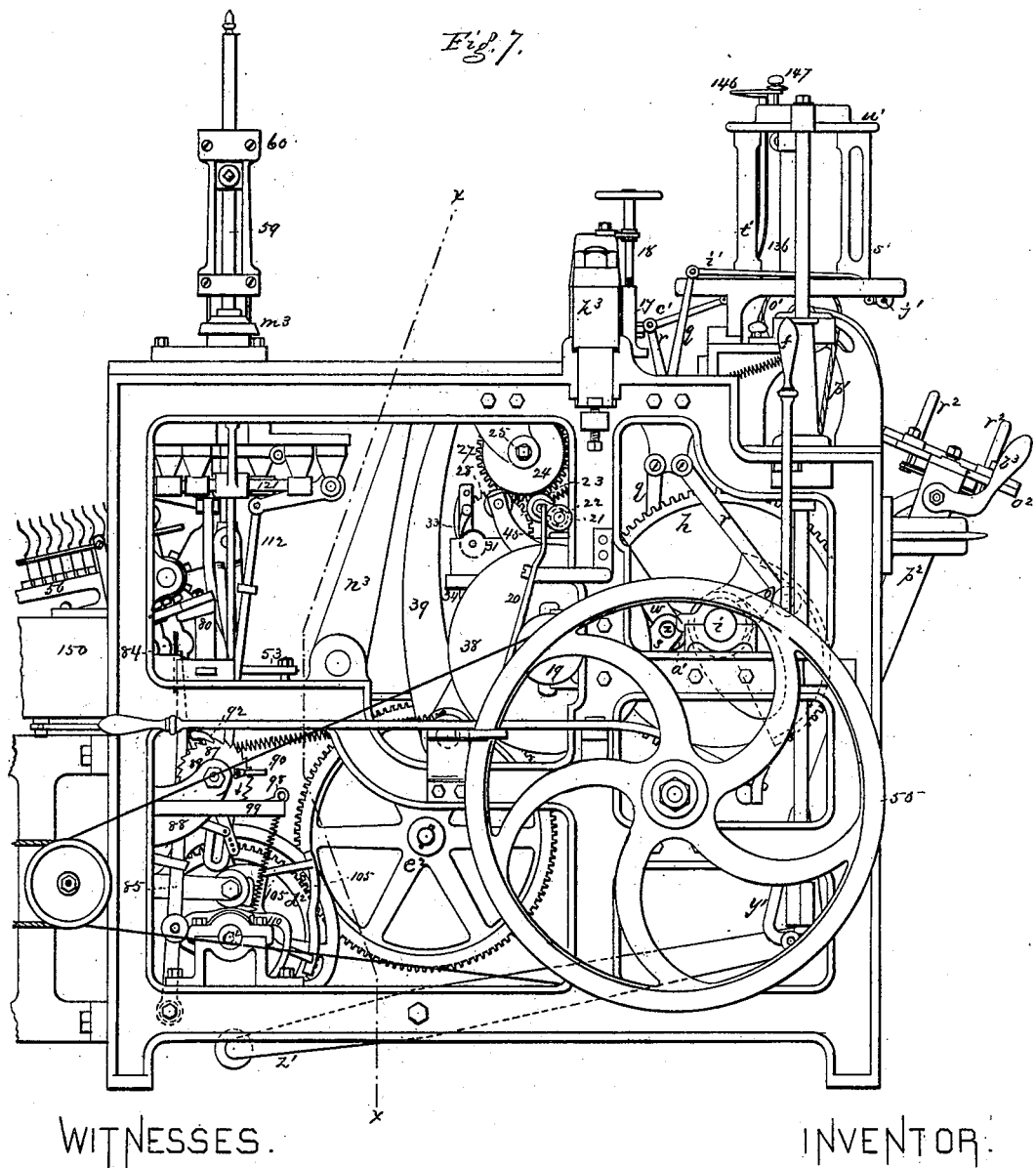
Figure 8:
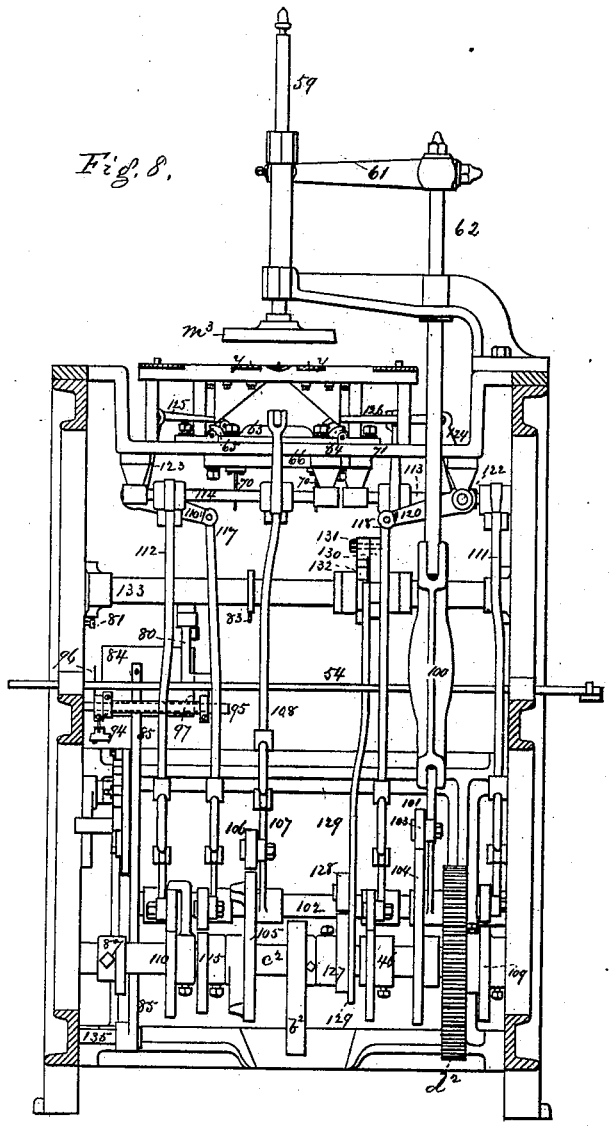
Figure 9:
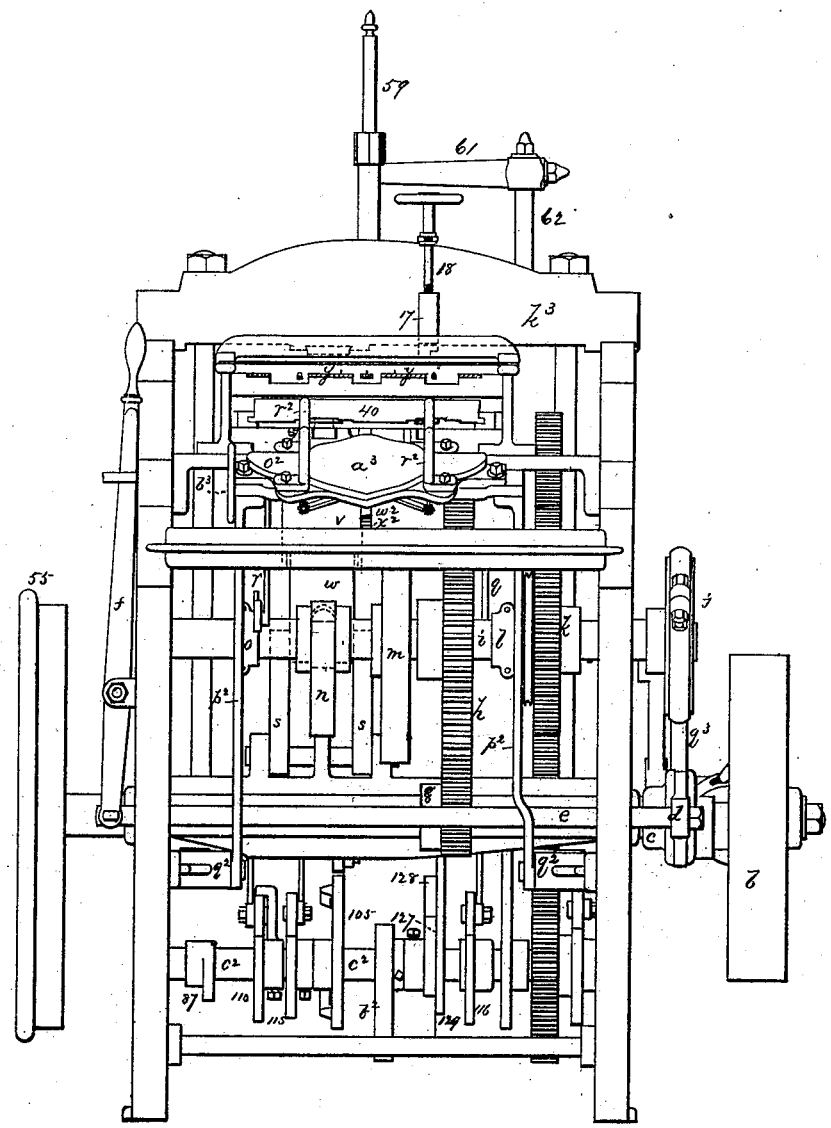
Figure 10:
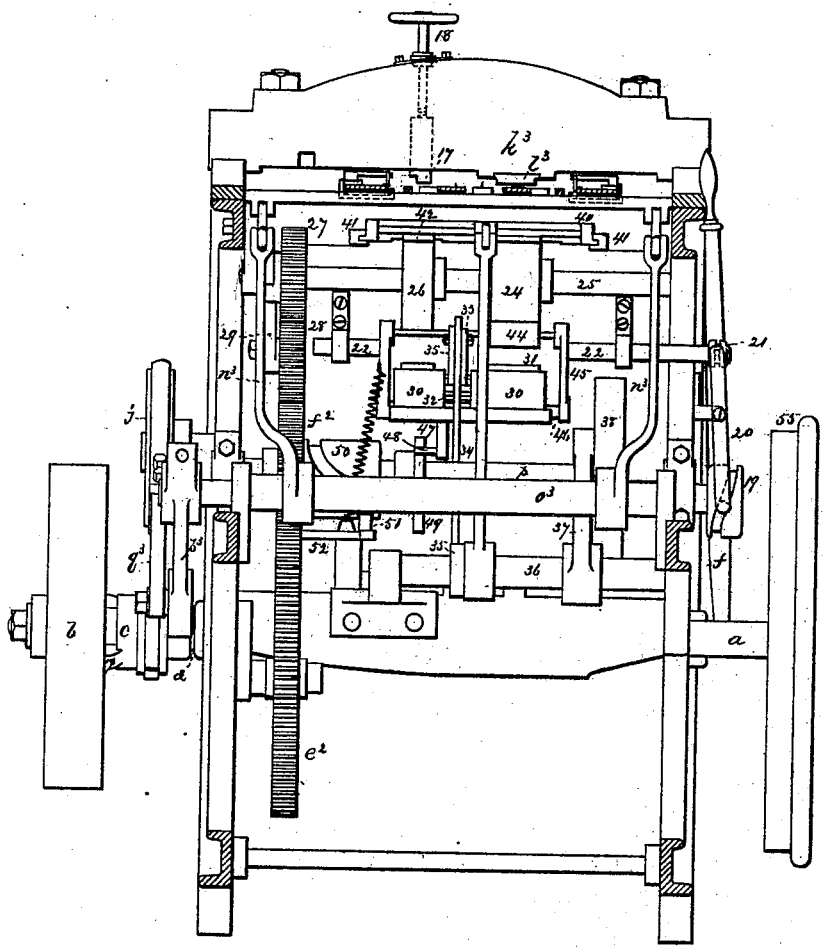
Figures 25, 26:
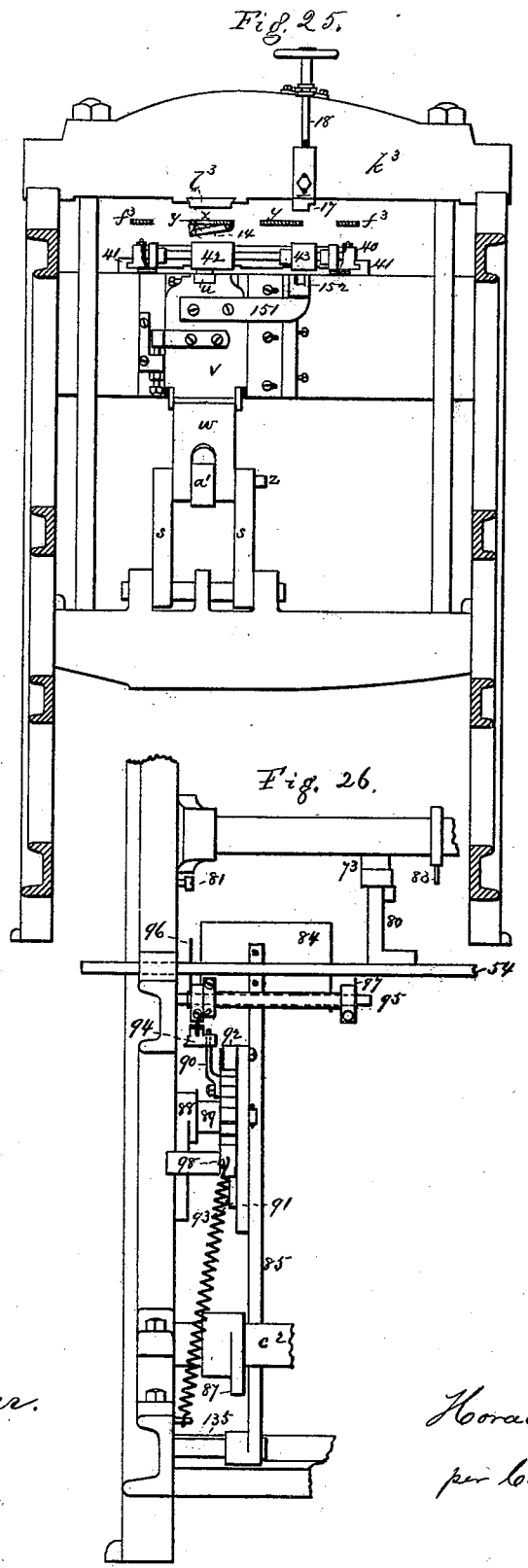

Figure 1 represents a left-hand side elevation of a machine provided with my improvements, looking from the end of the machine where the blanks are placed to be gummed. Fig. 2 is a top view. Fig. 3 is a view of that end of the machine where the gum-box is situated. Fig. 4 is a detail of the opposite end of the machine and the envelope-counting mechanism. Fig. 5 is a front-end view of a complete operative machine, looking toward the gum-box. Fig. 6 represents the right-hand side of such machine; Fig. 7, the left-hand side; Fig. 8, the opposite end of the machine, where the folding mechanism is located. Fig. 9 is a front end view, with the gumming apparatus removed, and the bed for the blanks turned outward. Fig. 10 is a section on lines $x\ x$, Figs. 6 and 7, looking from rear or folding end of machine. Fig. 11 is a top view, with gumming apparatus and beam and plunger removed; Fig. 12, details of side-flap gummer; Fig. 13, a side view of gum-box; Fig. 14, a top view; and Figs. 15 and 16, sections on lines A B C D, Fig. 14; Figs. 17 to 21, details of mechanism for holding the pile of blanks and releasing them. Fig. 22 is a top view of the gumming apparatus removed; Figs. 23 and 24, side and top views of the device for removing the envelopes singly from the delivering-chain. Fig. 25 is a section, showing the devices for stamping or printing the blank; and Fig. 26, a detail of the counting mechanism. Fig. 27 is a top view of the bed on which the blank is folded.

This invention is an improvement on Patent No. 71,252, wherein the blanks are gummed and folded, and the folding mechanism employed by me is substantially the same as that therein described.

The main shaft $a$ of the machine is driven preferably from a loose pulley, $b$, (see Fig. 10,) adapted to be connected with, and so as to operate, the shaft $a$ through a hub, $c$, provided with a friction-clutch mechanism to engage the interior of the pulley in any well-known way, the hub being grooved to receive a fork, $d$, on a shaft, $e$, Fig. 5, extended across the machine and connected with a shipper, $f$. On the driving-shaft is a cog-wheel, $g$, that engages a toothed wheel, $h$, on a shaft, $i$, provided with an eccentric, $j$, to operate the feeding mechanism, and this shaft also carries a toothed wheel, $k$, to operate a shaft, $p$, a pinion thereon being adapted (see Figs. 6 and 10) to operate the inking-rollers. Shaft $i$ also carries cams $l\ o$ to move the arms $q\ r$ adapted to reciprocate the gumming-rollers.

In Fig. 1 the shaft $i$ has a toe-cam, $n$, to operate the toggle-arms $s\ w$, pivoted at $t$, and connected with a slide, $v$, having at its upper end a die, $u$, by which the Government stamp is applied to the blank.

In practice the shaft $i$ will have an additional cam, $m$, (see Figs. 4 and 9,) and provided with a groove in its face to receive the end of connecting-pin $z$, to pull the slide $v$ and toggle down positively, and the pin $z$ will also be provided with a roll, $a^1$, to lessen friction on cam $n$, for the pressure necessary to properly imprint the Government stamp is very great. The stamping-die $u$ is adapted to rise up through an opening, $x$, (see Figs. 25 and 11,) in the strip $y$, two such strips $y$ being used, one at each side of the machine. This slide $v$ may also carry a type to print suitable words on the end of the envelope blank. Fig. 25 shows the slide $v$, provided with a projecting arm, 151, and a groove, 152, to hold a type, the latter rising through a longitudinal slot, 153, in strip $y$. (See Fig. 11.) The arms $q$ $r$ are connected with shafts 1 1, supported in suitable bearings, and at their opposite ends have arms like $q$ $r$, and the upper ends of these arms, connected by rods 2, are joined by links $i^1$ $c^1$ with the journal-boxes $d^1$ $j^1$ (see Figs. 1, 6, and 22) of the gumming-rollers $e^1$ $k^1$, adapted to slide on the rods $f^1$, supported by frame $g'$ above the gum-box $l^1$, and to take gum from the gum-box roller $h^1$. (See Figs. 5 and 13 to 16.) This roller $h^1$ is driven from shaft $i$ by means of a band that passes about a pulley, $o^1$, on the end of the shaft $m^1$ of the gum-box roller. In practice, this pulley $o^1$ will be on a short shaft, $n^1$, (see Fig. 5,) connected by a fork with the end of shaft $m^1$, to allow the gumming mechanism to be removed without unshipping the driving-band of the gum-box roller. The gum is placed in the end $q^1$ of the gum-box, and as the roller $h^1$ rotates in the direction of the arrow, Fig. 14, the gum is caused to circulate under the bearing $h^2$ (the black space, Fig. 15, showing the passage) in the direction of the arrows, and the "doctor" or scraper $r^1$ pivoted in the gum-box regulates the quantity of gum taken up by the roller and applied to the gumming-rollers, they being retained in contact with the gum-box roller, except at the time that the gummers $s^1$ $t^1$ are elevated above the gum-box, and then the gumming-rollers placed, it will be observed, with their axes parallel with the length of the gummers, are each moved away from the gum-box roller in opposite directions, and over the lower ends of the gummers.

The extent of motion given to the gumming-rollers is much less than would be the case if the rollers were at right angles to the gummers, or were on one carriage, and moved in but one direction; and by placing the axes of the gumming-rollers with relation to the length of the gummers, as shown, the gum is evenly and equally spread on the gummers, a fresh and properly-gummed surface coming in contact with the entire face of the gummers, which is not the case when a gumming-roller, with its axis at right angles to the gummer, is rolled over them.

By the arrangement of gumming-rollers and gummers, as herein described, the gummers apply an equal quantity of gum from one to the other edge of the seal-flap, and apply more gum than is the case when the gumming-rollers have their axes at right angles to the gummers, for in this last construction the end of the gummers last passed over are not as heavily coated as the ends first touched by the rollers. The gummers $s^1$ $t^1$ operating to pick up the envelope-blanks, as usual, depend from a cross-head, $u^1$, sustained by rods $v^1$, guided in boxes $x^1$, and connected at their lower ends by a bar, $w^1$, joined by a link, $y^1$, with a lever, $z^1$, pivoted at $a^2$, and provided with a roller to be struck by a cam, $b^2$, on shaft $c^2$, having a pinion, $d^2$, engaged by an idler-wheel, $e^2$, moved from the pinion $f^2$ on shaft $p$, pinion $f^2$ being operated from pinion $k$ on shaft $i$. The gum removed from the roller $h^1$ by the "doctor" is crowded down into the box, and is caused to flow about the ends of the roller, and the gum which is usually quite thick is kept in constant circulation about the ends of the roller $h^1$, under the bearings $h^2$, as represented by the arrows, and a constant supply of gum is kept in the front of the gum-box. The journals or shafts $m^1$ of the roller $h^1$ turn in sleeves $i^2$, (see Figs. 14 and 16,) supported in bearing $h^2$, and provided with disks $j^2$ adapted to fit the ends of roller $h^1$ closely, or under the scraper at the ends of the rolls, the scraper fitting on or between the two disks, as the case may be, and this construction prevents the escape of gum through the bearings, a common fault with bearings and journals constructed as usual when worn away. By this construction the wear of the shaft $m^1$ or journal does not leave a space into which the gum can pass, and gum cannot get into the bearings except between the disks and roller ends; and gum will not reach and disturb the bearings if the disks are kept adjusted in contact with the roller ends, which may be done by loosening the journal-caps and crowding them forward.

It is often necessary to turn the doctor or scraper back from the gum-box roller to remove bits of paper or other extraneous matter; and in all other machines known to me to do this necessitates the removal of the screws that adjust the scraper and determine the quantity of gum to be carried up by the roller, and after the fault is corrected the screws must be again inserted, and the adjuster has to guess at the position formerly occupied by the screws and scraper, so as to apply the same quantity of gum to the envelope-blanks or cause a waste of valuable time in experimenting as to the proper position of the scraper.

To remove the scraper quickly and insure its replacement in the same position with reference to the roller, I have connected with the center of the scraper a threaded socket, $k^2$, into which is screwed a screw, $l^2$, and the head of the screw, meeting the side of the box $l^1$, governs the forward position of the scraper, and when the scraper is turned back the screw, fitting loosely in the hole in the box, moves back with the scraper. The scraper is held pressed forward at the ends by screws $m^2$ and pivoted buttons $n^2$, adapted to be turned between the ends of the screws $m^2$ and the scraper, and when the scraper is to be turned back the buttons are turned aside away from the ends of the screws, and the scraper can be turned back without turning out the screws $m^2$, and can be quickly cleaned and returned to its exact former position.

The envelope-blanks are placed on a bed, $o^2$, shown in Fig. 1 as a fixed bed, but in practice made to swing outward, and supported at the top of arms $p^2$, (see Figs. 5 and 9,) and on the top of the bed 1 usually place a piece of sheet india-rubber, $a^3$. The blanks are held between hollow posts $r^2$, (see enlarged views Figs. 17 to 21,)—four being used—having within them adjustable separators $s^2$, adapted to hook over the uppermost blank of the pile, and hold the pile down on the bed. These separators are carried by rods $t^2$ rising from a cross-shaped frame, $u^2$, provided with a hub, $v^2$, adapted to slide on a rod, $w^2$, attached to the under side of the bed, and resting on a spiral spring, $x^2$, strong enough to almost support the weight of the frame and separators. When the picking-up devices $s^1 t^1$ strike the upper blank of the pile the blow is sufficient to cause the separators, pressing but lightly on the blank, to rise a little, or release their pressure on the blank and permit it to be picked up easily by the devices $s^1 t^1$, and the separators then drop on the next blank.

The separators in the two posts at the outer edge or front of the bed are made as springs, (see Fig. 17,) and they press against the edges of the uppermost blanks near the junction of the back and side flaps, and keep the uppermost blanks always crowded against the posts $r^2$ at the rear of the bed, that govern the correct position of the seal-flap edge of the blank, and by means of these spring-separators the seal-flap edge of the blank is always in the proper position to be picked up by its gummer $t^1$, and the gum is always applied exactly at the proper position on the edge of the seal-flap, and the upper blank is never allowed to fall or get back of the next lower blank, for when this happens two blanks are lifted by the gummer, or else both blanks are left down and are lost.

The bed may be provided with a latch, $b^3$, to retain the bed in horizontal position. In Fig. 7 the gum-box $l^1$ is removed from its supporting-frame $c^3$.

In this machine the seal-flap portion of the blank leads, or is in advance, as the blank is moved through the machine by the feeding mechanism; whereas in most other machines the back-flap end leads.

The seal-flap gummer $t^1$, which also picks up the blank, is adapted to apply a much larger quantity of gum than the back-flap gummer $s^1$, and the gummer $t^1$ has therefore more power as a picking-up device, and seldom, if ever, fails to lift up the seal-flap, and the feed or device to carry the blank forward always gets properly under the blank; whereas it often happens in other machines where the back-flap gummer is nearest the feed, that the back-flap gummer does not lift the back flap properly, and then the feed or device to carry the blank forward does not get properly under it, and the blank is spoiled. By placing the seal-flap gummer nearest the feed, and keeping the seal-flap in advance, I am enabled to overcome the waste of blanks, and the necessity of often stopping the machine to remove spoiled blanks, and the picking up of the blanks, and their proper presentation to the feed, are made much more positive than heretofore. Strips $y f^3$ are placed at the top of the machine, (see Figs. 2 and 11,) and the envelope-blank in its passage through the machine is guided at its ends by the guides $h^3$, and is supported on the narrow ribs $a^x$, stiffened by the strips $y$, and these ribs are so small that the gum applied to them by the gummed edges of the flaps does not collect thereon and impede the passage of the blank through the machine, as would often be the case if the blank rested directly on the strips $y$. Under these strips I arrange the carriage $i^3$ of the envelope-feeding mechanism, having adjustably connected therewith the pulling-bars $j^3$, provided with hooks 3 near the center of their length, and with other hooks 4 at their ends, (see Fig. 11,) the hooks 4 taking the blank from the picking-up devices $s^1 t^1$, and carrying it in position under beam $k^3$, to receive the impress of the Government die, or to be printed, and the hooks 3 then engage and carry the blank forward to the position where it is taken by the pushing-bars 5, that carry the blank in the proper position under the usual plunger $m^3$, (see Fig. 7 and 8 of the folding mechanism,) and by these hooks on the rods connected with the carriage, the blanks are intermittingly moved through the machine, and placed in proper position to be stamped and folded. The under side of the beam $k^3$ will be provided with a removable block or bed, $l^3$, (see Figs. 10 and 25,) against which the stamp will be pressed, and this bed will preferably be provided with a heavy piece of leather directly opposed to the stamp, and the beam will also be provided with a bed, 17, adjustable by a screw, 18, and adapted to work in opposition to the type to print the envelope. The feeding-carriage derives motion from arms $n^3$, on a rock-shaft, $o^3$, having an arm, $p^3$, connected by a link, $q^3$, with eccentric $j$. I propose to pivot catches $t^3$ (see Fig. 11) on brackets $s^3$, to prevent backward movement of the blanks when the feeding-hooks move toward the gumming apparatus. Above the strips $y$, and connected with springs 10, attached to forked holders $w^3$, and with the bar on which the gum-box rests, are cords 6 7 8 9, under which the blanks pass, and by which they are kept down in engagement with the feeding-hooks, the springs 10 keeping the cords taut.

In Fig. 11 I show forks 11, to press the cords down evenly, and the under sides of the forks are grooved to prevent lateral movement of the cords. Just before the die $u$ is projected through the opening $x$ in the strip $y$, to impress the Government stamp, blank stops 12, (shown only in Fig. 11,) on the ends of arms 13, pivoted at 14 to the machine-frame and lifted by the carriage $i^3$, rise and stop the blank in the proper position to receive the stamp in the corner of the face of the envelope, and after the blank is properly placed, the toggle is operated and the die is raised. As the die rises the slide $v$ strikes and raises the cord-lifter 14, (see Figs. 1 and 25,) pivoted to the under side of strip $y$, and the lifter lifts cord 8, and prevents the envelope-blank from being drawn laterally over the inked die as the latter rises, thereby preventing the stamp or impression from becoming blurred, as would be the case if the blank was held down at the side of the die in a position lower than the upper or stamping position of the die.

The inking devices are of any usual construction, but I prefer to use for this purpose those shown in the several drawings, and they derive motion from a shaft, $p$. This shaft $p$, viewing it from the front of the machine, has at its right-hand end a grooved hub, 19, Fig. 7, adapted to operate a lever, 20, provided at its upper end with a pin to enter a groove in a hub, 21, on a shaft, 22, adapted to move longitudinally a frame provided with an ink-distributing roller, 23, that reciprocates over the inking-roller 24 on the shaft 25, a roller, 26, on the same shaft working against the printing-type. The shaft 25 has a toothed wheel, 27, that engages an idle wheel, 28, supported by an arm, 29, the idle wheel being operated by the wheel $f^2$. The box or boxes 30, holding the ink, have a roller or rollers, 31, provided on their journals with rachet 32, engaged by pawls 33, on a pivoted pawl-carrying lever, 34, connected with a cam 35, on a rock-shaft, 36, provided with an arm, 37, having a pin or roll entering an irregular groove in a cam, 38, on shaft $p$, the cam moving the rock-shaft 36 provided also with an arm, 39, connected at the top with the frame or carriage body 40, working in guides 41 and carrying the inking-roller 42, 43, adapted to convey the ink from rollers 24 or 26, to the surface of the die or to the type, the rollers being moved over the die or type when lowered. The ink is conveyed from the rollers in the ink-box to the roller 24 by means of a roller, 44, a similar roller being used to convey ink to roll 26, if it is used. This roller 44 is carried by vibrating arms 45, on a rock-shaft, 46, provided with an arm, 47, having a pin, 48, struck by a cam, 49, on shaft $p$, and on this same shaft is a cam-hub, 50, grooved to receive a roller or pin, 51, (see Fig. 10,) attached to a lever, 52, and connected by a link, 53, with the bar 54, carrying the fingers or devices to pick the envelopes out of the chain 56, where they are deposited by the folding mechanism. The folding mechanism and chain are of ordinary construction. The fly-wheel 55 (see Fig. 7) on shaft $a$ is connected by a band with a shaft connected in turn, as usual, by a band with a shaft carrying a fan to dry the envelopes as they are carried by the chain 56, a portion only of which is shown.

The envelope-blank to be folded is projected by the fingers 5 forward over the opening 57, (see Fig. 11,) the ends of the blank passing under the guide-fingers 58, and at this time the plunger $m^3$, carried by the rod 59, sustained in guideways 60, and carried by arm 61 on rod 62, descends and pushes the blank down through the opening 57. As the plunger descends with the blank the folding wings 63, 64, and 65, for turning over the back and end or side flaps, remain in vertical position, and the folding-bed 66 moves up toward the plunger, and comes to a horizontal position as the plunger reaches the bottom of its stroke; then as the plunger rises, the wings 63, 64, and 65 close, turning the back and side flaps from a perpendicular to a horizontal position, and then the seal-flap folder 67 folds the seal-flap over against the upper side of the side and back flap-folders then holding the blank, thus preventing the gummed seal-flap from coming in contact with the other portions of the blank. When folded the folder 67 first rises, then the folder 64 and 65, and then the folder 63 and the bed 66 is lowered. The face of this bed is grooved or cut away, (see Fig. 27,) leaving portions 68 and the rim 69 higher than the rest of the bed, and this prevents the gum used to unite the back and side-flaps from being spread too far and passing beyond the contacting edges of the back and side flaps. As the bed approaches its lowest position the upper end of stationary curved fingers 70, attached to the plate 71 sustaining the folding-wings, pass through openings 72 in the bed and lift the folded envelope, and it falls from the inclined face of bed into and between the links of the chain or belt adapted to carry away and dry the envelopes. The envelope drops into the chain with the seal-flap or top of the envelope down. This chain is not in itself new, and is shown in Patent No. 71,252, but in this my machine the chain moves away from the end of the machine instead of back under the machine, enabling ready access to be had to the chain. This chain, being endless, carries the envelopes back to the end of the machine, and then they are picked or drawn out one by one from the links by means of a picker, shown enlarged in Figs. 23 and 24, and also in Fig. 1. This picker is composed of a rigid finger, 73, and a movable finger, 74, pivoted at 75, and provided with a spring, 76, to close it against the finger 73, and a pivoted spring-held catch, 77, is adapted to engage and hold the finger 74 away from the finger 73. The finger 73 is slotted at 78 to connect with a projection, 80, on the reciprocating sliding bar 54, before described. As the picker completes its movement toward the outside of the frame on its own side of the machine, an adjustable stud, 81, on and projecting within the frame, strikes the end 82 of the finger 74 and opens it, as shown in Fig. 24, and the picker then moving forward receives between its fingers the end of an envelope, and the catch 77 then strikes against a stationary projection, 83, Fig. 26, suitably placed, and is turned to release the finger 74, which then grasps the envelope, and as the picker is moved back draws the envelope with it.

When drawn out and released a pusher, 84, on an arm, 85, pivoted at its lower end on a stud, 135, and provided with a roller, 86, is struck by a cam, 87, on shaft $c^2$, and the envelope is pushed forward into a trough or box, 150, arranged to receive the envelopes and placed by the side of the chain. (See Fig. 7.) The envelopes are to be made up into packages, preferably twenty-five in each package, and I have provided counting devices to throw each twenty-fifth envelope beyond its adjacent envelope. A bracket, 88, provided with a pin or stud, supports a ratchet, 89, having twenty-five teeth and a projecting finger or indicator, 90. A pawl-carrying arm, 91, placed on the stud that carries the ratchet, and carrying a pawl, 92, is connected by a link, 93, with the arm 85, and turns the ratchet one tooth at each time the pusher 84 moves forward with an envelope. As each twenty-fifth envelope is pulled out the finger 90 strikes a projection, 94, attached to a rod, 95, carrying two plates, 96 97, arranged to be moved with and by the rod. The plate 96, when not moved away from the chain by the rod 95, its projection 94, being acted on by the finger or indicator 90, serves as a guide-stop for the ends of the envelopes drawn out by the picker; but as each twenty-fifth envelope is drawn out and released the rod 95 and plates are moved laterally, and the plate 97 acts against the end of the envelope nearest the chain and moves its outer end beyond the ends of the envelope in the box in advance of it. A suitable spring holds the rod 95 toward the chain. A detaining-pawl, 98, on bracket 99, prevents retrograde motion of the ratchet 89.

In connection with this counting mechanism I may use a registering mechanism. The rod 62 of the folding mechanism is connected by a link, 100, with an arm, 101, on a stationary bar or shaft, 102, the arm being provided with a roller, 103, adapted to be struck by a cam, 104, on shaft $c^2$, this shaft deriving its motion through toothed wheel $d^2$. This shaft 102 is provided with a cam, 105, adapted to lift and hook over a roller, 106, on arm 107, pivoted on shaft 102, and connected by link 108 with the under side of the bed 66 to raise and lower the bed positively. Other cams, 109 and 110, through arms provided with rollers and connected by links 111 112 with rock-shafts 113 114, operate the folder for the seal and back flaps of the envelopes, and cams 115 116 connected through links 117 118 and arms 119 120 with rock-shafts 121 122, provided with arms 123 124 and links 125 126, operate the folders for the side flaps. Each rod, 111, 112, 117, and 118, or their arms acted on by the cams on shaft $c^2$ adapted to lift them, are provided with strong spiral or other springs to throw them down, the springs for this purpose not being shown in the drawing, except the spring 134 for the rod 112. (See Fig. 6.) The shaft $c^2$ carries another cam, 127, adapted to act on a roll, 128, on a link or rod, 129, connected at its upper end with a pawl-carrying frame, 130, provided with a pawl, 131, adapted to engage a ratchet, 132, on the shaft 133, that sustains the inner end of and moves the envelope-carrying chain.

One of the side flaps is gummed by means of a side-flap gummer, 136, connected with the cross-head $w'$. This gummer is made as a hollow tube, (see Fig. 12,) and has a removable bottom plug, 137, provided with a cover, 138, having gum-passages 139, and a passage, 140, for a regulator, 141, the regulator also passing through an opening, 142, in the bottom of the plug. The regulator is a rod adjustably connected at top with a pivoted lever, 143, held up at its outer end by a spring, 144, to keep the lower end of the regulator down through the passage 142. A bracket, 145, attached to the frame of the machine, has at top a turning-finger, 146, provided with a set-screw, 147, that engages the end of the lever 143 each time the cross-head $w'$ rises, and draws the regulator up, this action permitting the gum to pass through opening 142, and to be applied to the side flap at the next descent of the side-flap gummer with the cross-head.

The quantity of the gum discharged is regulated by the screw 147, the extent of upward movement of the regulator controlling or measuring the quantity of gum discharged.

Instead of the hollow posts, to guard the separators and position the blanks, I might use two small rods, one each side the separators and their rods.

I claim—

1. The combination, in a machine for making envelopes, of mechanism to gum and pick up, and mechanism to fold, envelope-blanks, with mechanism arranged between the gumming and folding mechanisms to stamp or print the face of the blanks prior to folding, and with an intermittingly-acting feed to take the blank lifted by the gummers and carry it to the stamping-dies, and when stamped, to carry it to the folding mechanism, substantially as described.

2. The hollow post, in combination with rod $t^2$ and spring-separator, adapted to bear against the upper portion and edge of the blank, as set forth.

3. The envelope-blank-sustaining bed and hollow posts, in combination with separators arranged to move up and down within the posts, substantially as described.

4. The envelope-blank bed and back posts and separators, in combination with front posts and spring-separators, to keep the uppermost blank pressed against the back posts, to be acted upon by the gummer, substantially as described.

5. The gum-box and its roller $h^1$, and the gummers, arranged at each side thereof, as described, in combination with the independently-acting gumming-rollers, adapted to move simultaneously in opposite directions from the gum-box roller over the gummers, substantially as and for the purpose set forth.

6. The combination of the gum-box and its roller with the scraper and its adjusting-screws, and interposed pieces, substantially as described, whereby the scraper can be moved away from the roller, and be replaced without disturbing the screws, as set forth.

7. The gum-box roller and its journals, in combination with the sleeves $i^2$ and disks $j^2$, substantially as described.

8. The gum-box $l'$ and its supplying-chamber $q'$, and roller $h^1$ and scraper, in combination with the bearings $h^2$, extended across the gum-box, and constructed to afford a passage-way for the circulation of the gum, substantially as described.

9. The seal and back flap gummers, and independently-actuated gumming-rollers, as described, in combination with the side-flap gummer, constructed as described, and its lever 143, and stop 147, to regulate the quantity of gum discharged, substantially as described.

10. The combination, with the feeding and envelope-blank supporting devices, of the cords, and a tension device to keep the cords taut, and hold the blanks down, substantially as set forth.

11. The combination of the support for the blank, and the die and cords 6 7, with the cord-lifter, substantially as described.

12. The combination, with the carrier that receives the folded envelopes, of a reciprocating jaw or picker, and devices to open and close it, to seize and draw the folded envelopes laterally from the machine.

13. The combination, with the reciprocating jaw or picker to draw the envelope from the carrier and plate 97, and its supporting-rod 95, of a ratchet-wheel and indicator 90, to move the plate 97, and project an envelope beyond the envelope next in advance of it, substantially as described.

In testimony whereof I have signed my name to this specification in the presence of two subscribing witnesses.

HORACE J. WICKHAM.

Witnesses:
MARO S. CHAPMAN,
EDWARD H. STERNS.